Jan. 25, 1944.  R. L. SAVAGE  2,339,882
CATALYTIC TREATING APPARATUS
Filed Feb. 3, 1942
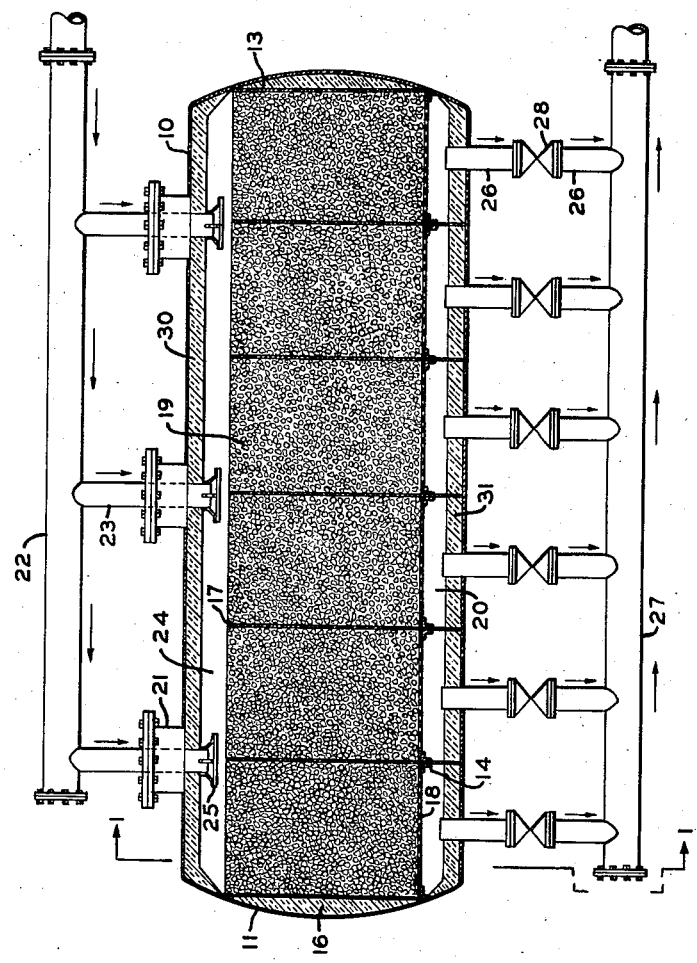
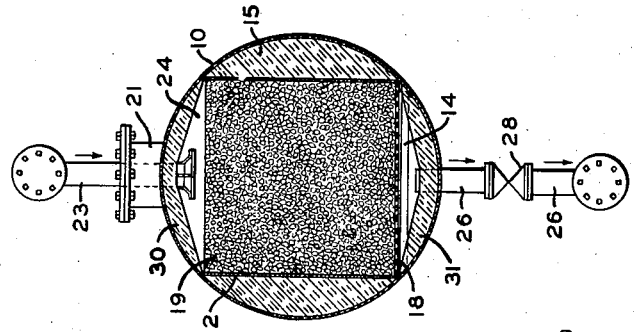
Rufus L. Savage
INVENTOR
BY R. J. Dearborn
HIS ATTORNEY Patented Jan. 25, 1944

2,339,882

UNITED STATES PATENT OFFICE 2,339,882

CATALYTIC TREATING APPARATUS

Rufus Llewellyn Savage, Scarsdale, N. Y., assignor to The Texas Company, New York, N. Y., a corporation of Delaware Application February 3, 1942, Serial No. 429,406

7 Claims. (Cl. 196—52)

This invention relates to apparatus for the catalytic treatment of hydrocarbons and pertains especially to apparatus adapted for the treatment of hydrocarbons under superatmospheric pressure.

The invention contemplates a cylindrical treating vessel adapted for the treatment of the hydrocarbons under superatmospheric pressures. The invention is adapted particularly for a catalytic treating process in which the catalyst is revivified or regenerated in situ. In such processes it is desirable to employ catalyst beds having a relatively low pressure drop through the catalyst. In accordance with the invention provision is made for having the catalytic material in a bed or beds of relatively small depth disposed within the cylindrical treating chamber and the invention contemplates a horizontally disposed cylindrical chamber with the catalyst bed arranged therein for the passage of the hydrocarbons, as well as the revivifying gases, in a substantially vertical path through the catalytic material.

In the catalytic cracking of hydrocarbons a common practice is to heat the hydrocarbons to the temperature desired for cracking and then pass the heated hydrocarbons into a chamber containing the catalytic material. In such operation it is ordinarily desirable to minimize or avoid insofar as is possible any strictly thermal cracking which may take place when the hydrocarbon is not in contact with the catalyst. In accordance with my invention a maximum portion of the volume of the cylindrical chamber is occupied by the catalyst and dead spaces within the chamber, or spaces which are not required for the proper admission and withdrawal of hydrocarbons to and from the catalyst, are blanked off so as to minimize the space volume in which noncatalytic or thermal cracking could take place.

The invention contemplates a horizontally disposed cylindrical pressure vessel having a rectangular catalyst container inscribed within the walls of the vessel so as to leave spaces above and below the container, between the side walls of the container and the wall of the pressure vessel and between the end walls of the container and the end walls of the pressure vessel, with the spaces above and below the container in communication with the hydrocarbon fluid undergoing treatment and with the spaces adjacent the side walls and end walls of the container being blanked off to prevent the admission of hydrocarbon fluid thereto. The catalyst container is open at the top and is provided with a means at the bottom adapted to retain the catalytic material but pervious to the passage of the hydrocarbon fluid, and the spaces above and below the catalyst case are reduced in volume so as to minimize the space volume available for non-catalytic cracking.

The invention provides a pressure treating vessel of simplicity of design and operation having important advantages in the catalytic treatment of hydrocarbons and in the revivification of the catalyst in situ, which will be fully understood from the following detailed description of the invention, reference being had to the accompanying drawing wherein:

Fig. 1 is a sectional elevation of the treating vessel and

Fig. 2 is a cross-section taken on the line I—I of Fig. 1.

Referring to the drawing, a cylindrical metallic chamber 10 having appropriate convex end walls 11 is mounted in a horizontal position. A catalyst container or case having side walls 12 and end walls 13 is disclosed within the pressure vessel 10, the case being inscribed within the wall of the cylindrical pressure vessel. Angle irons 14 are provided for supporting the catalyst case. The edges of the side walls 12 which are contiguous to the wall of the vessel 10 may be welded to the wall or the joints may be otherwise sealed to provide fluid tight joints and, similarly, the edges of the end walls 13 contiguous to the end walls 11 of the pressure vessel may be welded or the joints may be otherwise sealed to provide fluid tight points. The spaces between the side walls 12 and the wall of the pressure vessel may be filled with any suitable filling material 15, preferably insulating material, such as asbestos, cement, gunnite and the like, and similarly, the spaces between the end walls 13 of the catalyst container and the end walls 11 of the pressure vessel may contain filling or insulating material 16.

Transverse partitions 17 divide the catalyst container into a plurality of sections and each section is provided with a perforated plate or screen 18 supported on the angle irons and adapted for supporting catalytic material 19 while permitting the passage of fluids therethrough. The transverse partitions 17 extend below the screens 18 and are supported at the bottom by the shell of the vessel 10, so as to form a plurality of sections or compartments 20 between the screens and the wall of the vessel 10. Each of these partitions is preferably sealed to the shell of the vessel so as to prevent the passage of fluid from one compartment to another. The catalyst may comprise any of the usual catalytic materials that are employed in the cracking or conversion of hydrocarbons such as the silica alumina type of catalyst. The catalyst may be in granular or pulverized form or may be in pellets of various sizes, as for example, synthetic silica alumina cylindrical pellets of ⅛" x ⅛" size.

A plurality of manways 21 provide access to the pressure vessel 10 for the periodical charging and removal of the catalytic material. A pipe 22 extends from a suitable heater in which the hydrocarbons are heated to the desired conversion temperature and is provided with a plurality of branch lines 23 which may conveniently extend through the manway covers to communicate with a space 24 within the vessel 10 and above the catalytic material. Distributor plates 25 may be suitably strapped to the pipes 23 for the purpose of distributing the fluid discharging from the pipes into the pressure vessel.

Each compartment 20 is provided with a drawoff pipe 26. The several pipes 26 extend to a manifold line 27 and each of the pipes 26 is provided with a valve 28. The passage of fluid through each of the catalyst beds may be controlled by regulating the valves 28 in relation to some commonly used measurement of temperature or pressure drop indicative of the passage of fluid through each bed. For example, each catalyst bed may be provided with a thermocouple or an orifice type of measuring device and may be provided for each of the drawoff lines 26.

A portion of the space above the catalyst beds adjacent the wall of the pressure vessel 10 is blanked off or filled with filling or insulating material 30 and, similarly, a portion of each of the spaces 20 beneath the screens 18 and adjacent the wall of the pressure vessel 10 is blanked off or filled with filling or insulating material 31 so as to thus reduce the space volumes within the pressure vessel 10 which would otherwise be available for non-catalytic conversion.

In employing the apparatus illustrated for the catalytic cracking of hydrocarbon oils the cylindrical chamber 10 is charged with a suitable catalyst such as a silica-alumina type of catalyst in pellet form. Hydrocarbon oil vapors received from a heating zone at a temperature, for example, 1020° F. are introduced through manifold line 22 and branch lines 23 to the catalyst chamber which is maintained under superatmospheric pressure, as, for example, 35 pounds per square inch. The vapors are distributed by the distributor plates so that streams of vapor are delivered to the several catalyst beds. The vapors flow downwardly through the beds and through the screens or perforated plates 18 into the several compartments 20 from which the treated vapors are withdrawn through the several drawoff lines 26, thence to the manifold line 27. By observing the temperature of the fluid flowing through the drawoff lines, or by means of an orifice meter associated with each of the drawoff lines, an accurate observation of the rate of flow through the several beds is maintained and by appropriate use of the valves in the drawoff lines an even flow of fluid through the several beds is maintained. After the apparatus has been on stream for a time the hydrocarbon stream may be diverted to another catalyst containing chamber and the catalyst in the first chamber is then purged and revivified by passing gases through the catalyst beds capable of burning the carbonaceous material occluded in the catalyst and serving to reactivate the catalyst for further use. When the catalyst is revivified the stream of hydrocarbon vapors for catalytic treatment is delivered to the revivified catalyst. In this way, by alternate periods of catalytic cracking and revivification, the same catalytic material may be used for extended periods of time.

Obviously many modifications and variations of the invention, as hereinbefore set forth, may be made without departing from the spirit and scope thereof, and therefore only such limitations should be imposed as are indicated in the appended claims.

I claim:

1. A treating apparatus for effecting contact between solid catalytic material and a hydrocarbon fluid undergoing contact treatment which comprises a horizontally disposed cylindrical chamber having convex ends, a rectangular case adapted to contain solid catalytic material, said case being formed with side walls and end walls and being disposed within the cylindrical chamber so as to leave spaces above and below the case, between the side walls of the case and the wall of the cylindrical chamber and between the end walls of the case and the end walls of the cylindrical chamber, with said spaces above and below the case being in communication with the hydrocarbon fluid undergoing treatment and with said spaces adjacent the side walls and end walls of the case being blanked off to prevent the admission of the hydrocarbon fluid thereto, said case being open at the top in communication with the superposed space and having means at the bottom adapted to support the catalytic material but pervious to the passage of the hydrocarbon fluid.

2. A treating apparatus for effecting contact between solid catalytic material and a hydrocarbon fluid undergoing contact treatment which comprises a horizontally disposed cylindrical chamber having convex ends, a rectangular case adapted to contain solid catalytic material, said case being formed with side walls and end walls and being disposed within the cylindrical chamber so as to leave spaces above and below the case, between the side walls of the case and the wall of the cylindrical chamber and between the end walls of the case and the end walls of the cylindrical chamber, with said spaces above and below the case being in communication with the hydrocarbon fluid undergoing treatment and with said spaces adjacent the side walls and end walls of the case being blanked off to prevent the admission of the hydrocarbon fluid thereto, said case being open at the top in communication with the superposed space and having means at the bottom adapted to support the catalytic material but pervious to the passage of the hydrocarbon fluid, and means for blanking off a portion of each of said spaces above and below the rectangular case adjacent the wall of the cylindrical chamber to thereby reduce the space volume available to the hydrocarbon fluid.

3. A treating apparatus for effecting contact between solid catalytic material and a hydrocarbon fluid undergoing contact treatment which comprises a horizontally disposed cylindrical chamber having convex ends, a rectangular case adapted to contain solid catalytic material, said case being formed with side walls and end walls and being disposed within the cylindrical chamber so as to leave spaces above and below the case, between the side walls of the case and the wall of the cylindrical chamber and between the nd walls of the case and the end walls of the cylindrical chamber, with said spaces above and below the case being in communication with the hydrocarbon fluid undergoing treatment, said case being open at the top in communication with the superposed space and having means at the bottom adapted to support the catalytic material but pervious to the passage of the hydrocarbon fluid, filling material disposed in said spaces between the side walls of the case and the wall of the cylindrical chamber and between the end walls of the case and the end walls of the cylindrical chamber and filling material disposed in a portion of each of said spaces above and below the rectangular case adjacent the wall of the cylindrical chamber to thereby reduce the space volume available to the hydrocarbon fluid.

4. A treating apparatus for effecting contact between solid catalytic material and a hydrocarbon fluid undergoing contact treatment which comprises a horizontally disposed cylindrical chamber having convex ends, a rectangular case adapted to contain solid catalytic material, said case being formed with side walls and end walls and being disposed within the cylindrical chamber so as to leave spaces above and below the case, between the side walls of the case and the wall of the cylindrical chamber and between the end walls of the case and the end walls of the cylindrical chamber, said case being open at the top in communication with the superposed space, a plurality of transverse partitions adapted to separate said case into a plurality of sections and extending below the case to the bottom wall of the cylindrical chamber to separate the space below said case into a plurality of sections, means at the bottom of each of said sections in said case adapted to support the catalytic material but pervious to the passage of the hydrocarbon fluid, means for the passage of the hydrocarbon fluid in communication with said space above the case at a plurality of laterally spaced points, means for the passage of the hydrocarbon fluid in communication with each of said sections below the case, and with said spaces adjacent the side walls and end walls of the case being blanked off to prevent the admission of the hydrocarbon fluid thereto.

5. A treating apparatus for effecting contact between solid catalytic material and a hydrocarbon fluid undergoing contact treatment which comprises a horizontally disposed cylindrical chamber having convex ends, a rectangular case adapted to contain solid catalytic material, said case being formed with side walls and end walls and being disposed within the cylindrical chamber so as to leave spaces above and below the case, between the side walls of the case and the wall of the cylindrical chamber and between the end walls of the case and the end walls of the cylindrical chamber, said case being open at the top in communication with the superposed space, a plurality of transverse partitions adapted to separate said case into a plurality of sections and extending below the case to the bottom wall of the cylindrical chamber to separate the space below said case into a plurality of sections, means at the bottom of each of said sections in said case adapted to support the catalytic material but pervious to the passage of the hydrocarbon fluid, a plurality of conduits adapted to admit hydrocarbon fluid to said space above the case at a plurality of laterally spaced points therein, a conduit extending from each of said sections below the case, and with said spaces adjacent the side walls and end walls of the case being closed to the admission of the hydrocarbon fluid thereto.

6. A treating apparatus for effecting contact between solid catalytic material and a hydrocarbon fluid undergoing contact treatment which comprises a horizontally disposed cylindrical chamber having convex ends, a plurality of beds of catalytic material disposed therein with a common chamber above the catalyst beds providing for the access of the hydrocarbon fluid to each bed, means for introducing hydrocarbon fluid to said common chamber, means at the bottom of each of said catalyst beds adapted to support the catalytic material but pervious to the passage of the hydrocarbon fluid, a separate compartment disposed within the cylindrical chamber and beneath each catalyst bed in communication with the hydrocarbon fluid flowing through the superposed catalyst bed and means for separately withdrawing hydrocarbon fluid from each of said compartments.

7. A treating apparatus for effecting contact between solid catalytic material and a hydrocarbon fluid undergoing contact treatment which comprises a horizontally disposed cylindrical chamber, a plurality of partitions therein extending vertically from the bottom wall thereof but short of the top wall thereof to form a plurality of sections, means adjacent the lower portion of each section but spaced from the bottom wall of the cylindrical chamber adapted to support a bed of solid catalytic material but pervious to the passage of hydrocarbon fluid and serving to separate a bed of superposed catalytic material from a chamber beneath, means for introducing hydrocarbon fluid to the cylindrical chamber at a point above the upper terminations of said partitions so that the hydrocarbon fluid flows in parallel through the several beds of catalytic material thence to the respective chambers beneath and means for separately withdrawing hydrocarbon fluid from each of said chambers.

RUFUS LLEWELLYN SAVAGE.